(12) United States Patent
Gelfman

(10) Patent No.: US 6,439,449 B1
(45) Date of Patent: Aug. 27, 2002

(54) ASSEMBLING JIG FOR SECTIONAL ARTICLES

(76) Inventor: Ephrem Gelfman, 5700 Fantail Ave., Sparta, WI (US) 54656

( * ) Notice: Subject to any disclaimer, the term of this patent is extended or adjusted under 35 U.S.C. 154(b) by 54 days.

(21) Appl. No.: 09/741,210

(22) Filed: Dec. 19, 2000

Related U.S. Application Data

(60) Provisional application No. 60/172,773, filed on Dec. 20, 1999.

(51) Int. Cl.⁷ ................................................. B23K 31/02
(52) U.S. Cl. ....................... 228/121; 228/212; 228/44.3; 228/49.1; 269/37
(58) Field of Search ................................. 228/121, 212, 228/44.3, 49.1; 269/37, 55, 56, 57, 63; 108/28; 211/85.14; 65/36, 59.1, 154, 156

(56) References Cited

U.S. PATENT DOCUMENTS

| | | | |
|---|---|---|---|
| 2,404,162 A | | 7/1946 | Brown |
| 3,769,504 A | | 10/1973 | Hesse et al. |
| 4,209,164 A | * | 6/1980 | Brothers ...................... 269/239 |
| 4,327,786 A | * | 5/1982 | Markkula .................... 144/139 |
| 4,483,813 A | * | 11/1984 | Longo .......................... 249/60 |
| 4,497,477 A | * | 2/1985 | Abel ........................... 269/303 |
| 4,541,038 A | | 9/1985 | Van Noord |
| 4,731,716 A | | 3/1988 | Chang |
| 4,861,364 A | * | 8/1989 | Trujillo et al. ................. 24/442 |
| 4,912,849 A | * | 4/1990 | MacCarthy ................ 33/1 AA |
| 5,007,575 A | * | 4/1991 | Degenhardt ................ 228/44.3 |
| 5,224,691 A | * | 7/1993 | Clark ........................... 269/51 |
| 5,439,017 A | | 8/1995 | Brown |
| 5,558,269 A | * | 9/1996 | Wallace ..................... 228/49.1 |
| 5,884,904 A | * | 3/1999 | Martini ........................ 269/41 |
| 6,117,504 A | * | 9/2000 | Yoshikawa .................. 362/363 |
| 6,202,530 B1 | * | 3/2001 | Cawley ....................... 269/303 |

FOREIGN PATENT DOCUMENTS

| | | |
|---|---|---|
| GB | 2 197 712 A | 5/1988 |
| GB | 2 198 515 A | 6/1988 |

* cited by examiner

*Primary Examiner*—M. Alexandra Elve
*Assistant Examiner*—Colleen P. Cooke

(57) ABSTRACT

An apparatus and method for positioning and soldering together multiple stanined glass sections is disclosed.

2 Claims, 6 Drawing Sheets

1' X 1' X 1/2" THICK PLYWOOD

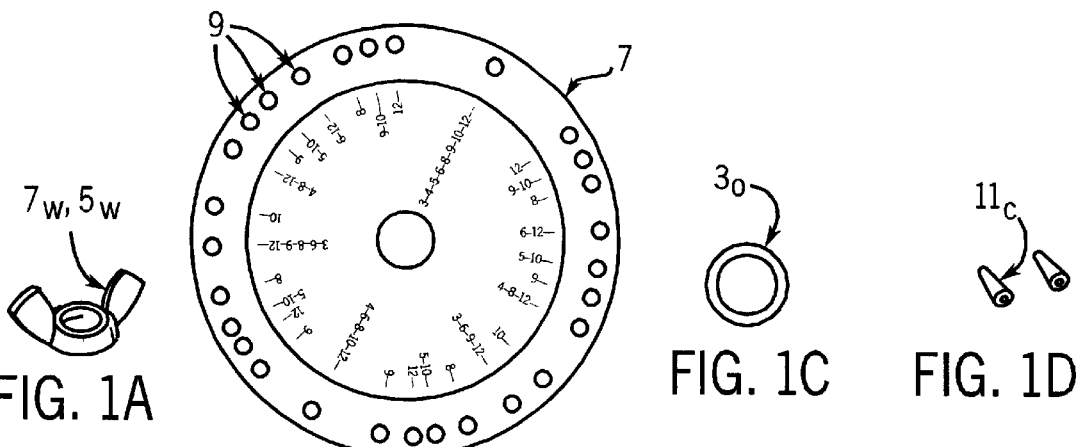
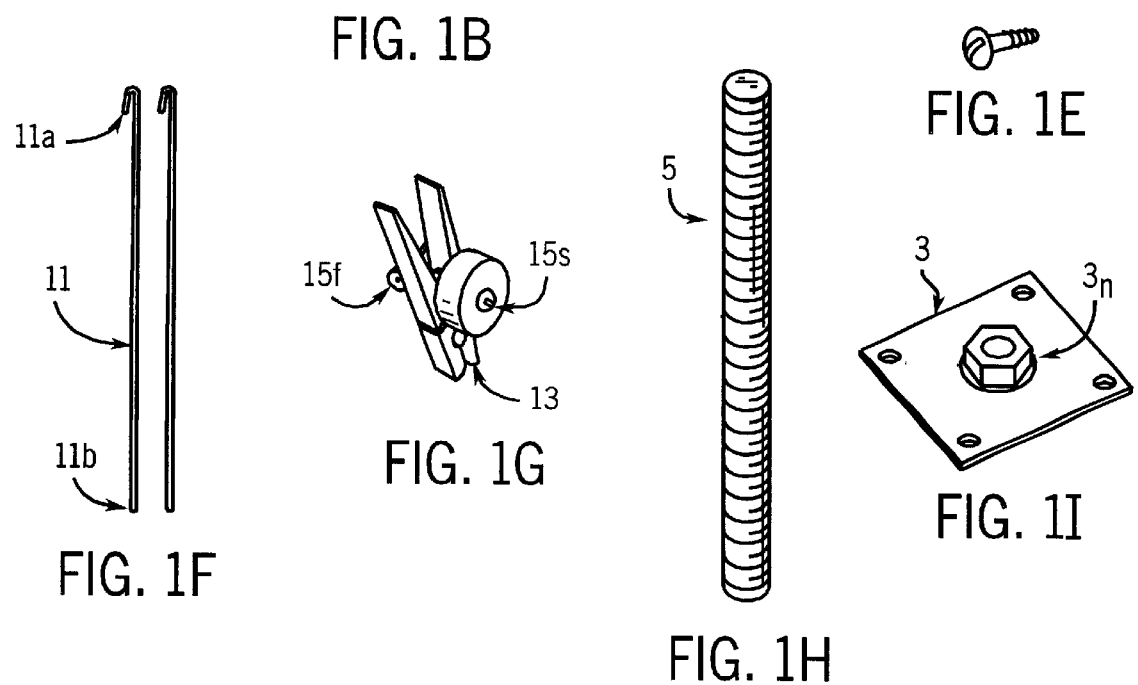
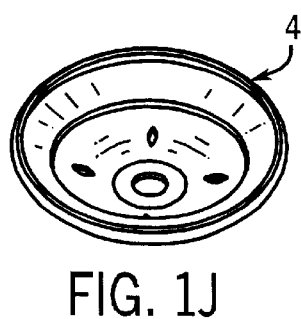

1' X 1' X 1/2" THICK
PLYWOOD

ASSEMBLING JIG FOR SECTIONAL ARTICLES

CROSS-REFERENCE TO RELATED APPLICATION

This application claims the benefit of U.S. Provisional Application No. 60/172,773 filed Dec. 20, 1999.

FIELD OF INVENTION

The present invention pertains to a device for assembling sectioned articles and more particularly to a jig for use in assembling stained glass sections together.

BACKGROUND OF THE INVENTION

It is conventional to assemble stained glass sections and solder the sections together in the form of a stained glass lamp shade. The assembly of stained glass lamp shades is generally accomplished by manually cutting glass sections for the desired lamp shade configuration, placing a metallic foil about the peripheral edges of the stained glass sections and then soldering the glass sections together. During the soldering operation, adjacent sections are typically manually held or propped in some form or manner so as to permit the soldering of the adjacently positioned glass sections together. The assembly of the stained glass sections by this technique is labor intensive and tedious.

Lamp shade kits equipped with all of the necessary pieces for lamp shade assembly are commercially available. These kits may include precut glass sections already wrapped with foil and a top cap. The top cap is an apertured annular ring of a circumferential or chordal size within which the top edges of the glass sections may be positioned in a side-by-side relationship and soldered together using the top cap as a template.

The manufacturer of lamp shades from stained glass sections creates particularly difficult work tasks in that the stained glass sections must be maintained in a precise configuration so as to yield the desired aesthetic product. Considerable experience is required in order to place and maintain each section at the correct angular configuration and to maintain the desired configuration consistently throughout the entire soldering process so that the end product exhibits the desired aesthetic symmetry in design. Under existing technology it is extremely difficult to consistently maintain all of the stained glass sections together at precisely the same angular pitch so that the soldered end product exhibits a symmetrical configuration throughout its entire design.

The patent literature is relatively silent as to jigs which may be used in the manufacture of soldered stained glass sections. The prior art has utilized jigs in the manufactured lamp shades constructed of fabrics.

There exists a need for an assembling jig for stained glass sections which would permit each stained glass section to be positioned at a precise angular and radial pitch throughout the entire construction so as to permit the artisan to tack and solder the stained glass sections together in a consistent reproductive and precise patterned array.

SUMMARY OF THE INVENTION

The present invention provides a mechanical assembling device for use in the manufacture of stained glass lamp shades. The device allows one to assemble stained glass sections at more precise angular pitches and radial dispositions. Adjacent stained glass sections may be tacked and soldered together in a precise and repetitive manner with exacting precision so that each successive stained glass section bears the same in angular disposition and placement as each other section within the soldered stained glass lamp unit. This allows the assembler of soldered stained glass lamps to reproduce, with great precision, a host of identically configured stained glass lamp shades.

The lamp jig device includes an upper suspension system for retaining a bottom portion of glass section and a base retaining section for retaining top portions of stained glass sections at a predetermined angular and radial configuration. An annular ring (such as the top cap supplied with stained glass lamp shade kits) of a circumference sufficient to retain adjacently positioned top portions of the glass sections in an equidistant cordial relationship may be used as the base retaining section. The upper suspension assembly includes a vertical support or post, an adjustable disc which may be variably adjusted along the post, graduated or calibrated anchoring sites radially positioned about the disc, suspended guides such as guy wires for anchoring onto the anchoring sites at calibrated intervals and adjustable clasping members supported by the guy wires for clasping and maintaining bottom portions of stained glass sections at a predetermined angular pitch. The disc may be adjusted at varying heights along the vertical support or post so as to accommodate glass sections of various sizes and at different pitches. The disc includes a plurality of anchoring sites in the form of calibrated anchoring apertures positioned at gradient angular vectors about the outer periphery of the disc. The anchoring sites are positioned in incremental angular gradients so as to provide angular degrees comparable to the number of glass sections. The supporting guide wires are fitted with anchoring connectors for anchoring onto the disc and adjustable clasping member for clasping onto the glass sections at an opposite wire end. A springed clasping member (such as a clothes pin) for clasping onto a glass section, a guy wire guiding ferrule equipped with a set screw for seating the clasping member at a desired clamping position along the guy wire may be used as the adjustable clasping member. When it is, for example, desired to construct a six (6) sectioned stained glass lamp shade, the top portion of one of the stained glass sections is placed in the annular ring and the guy wire is appropriately anchored to the disc anchoring site suitable for the assembly of a six (6) sectional lamp shade. The bottom portion of each glass section is then clasped by the clasping member and adjusted to the desired angular pitch by sliding the ferrule guided clasping member along the guy wire. When the desired angular pitch is achieved, the set screw is tightened to anchor the clasping member to the guy wire. The next adjacently positioned stained glass section may then be placed at an adjacently positioned 60 angular degree anchoring site from the first anchoring site for the first positioned glass section. The clasping member is clasped onto the bottom portion of the second glass section and the clasping member is then adjusted and set to position the adjacently positioned section at the same angular pitch as the first section. The set screw is then set onto the wire so as to maintain the second clasping member and the stained glass section in the precise configuration as desired for tacking and then soldering. This process is sequentially repeated until all of the remaining glass sections are assembled and tacked together. This reproducible procedure maintains all of the assembled glass sections at precise angular pitches and radial dispositions. The assembler merely tacks and solders together the two (2) sections without manually holding either of the two (2) sections. The device permits for the manufacture of extremely uniform lamp shade configurations with each glass section being maintained at a precise angular pitch and radial disposition from one another. The device reduces costs and wastes while also significantly reducing the time needed to manufacture stained glass lamp shades.

BRIEF DESCRIPTION OF THE DRAWINGS

FIG. 1 depicts an exploded view of unassembled parts for assembling the jig of this invention.

DETAILED DESCRIPTION OF THE INVENTION

Figure 2:
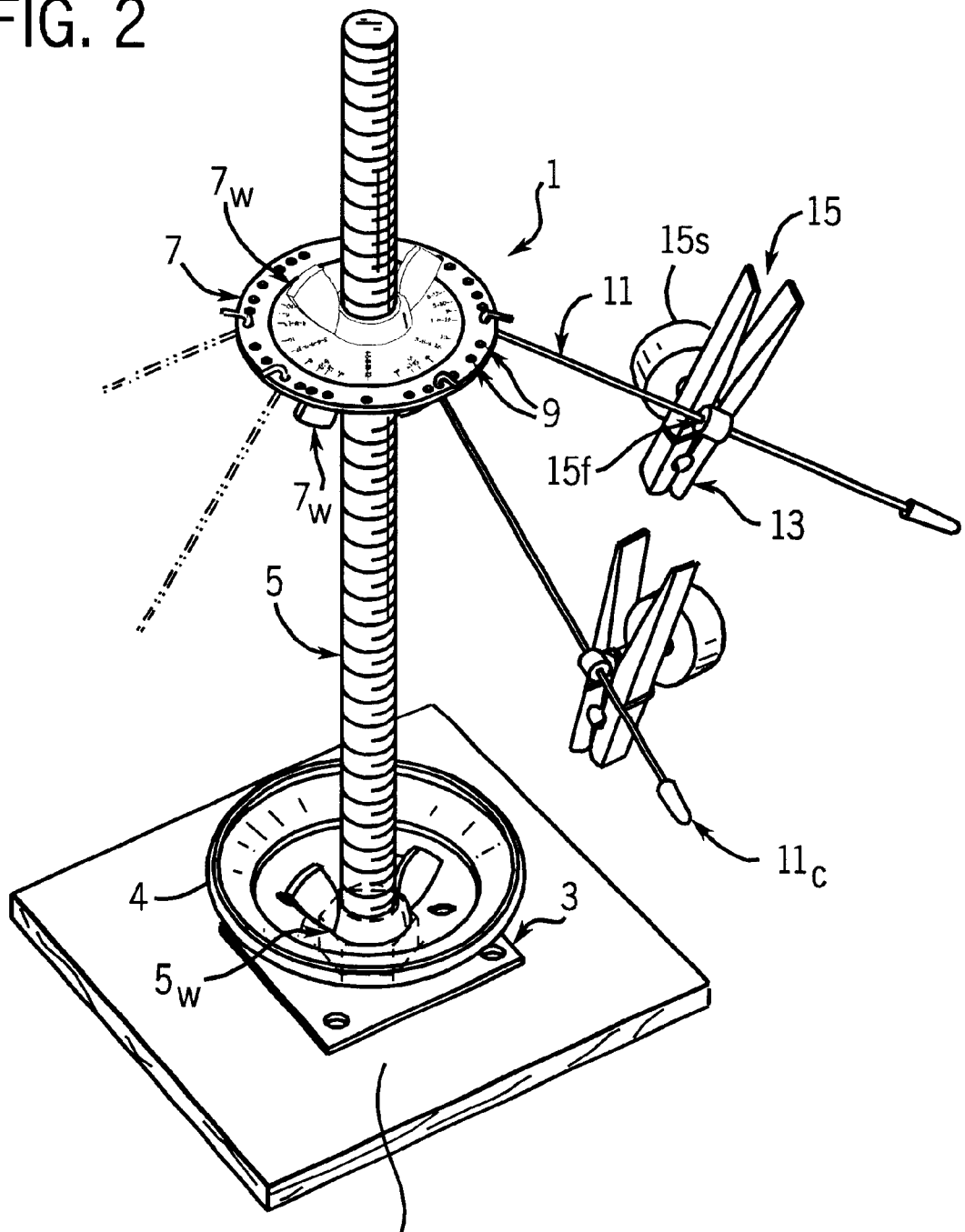
FIG. 2 depicts an elevational side view of a partial assembly of the parts for the jig shown in FIG. 1.
Figure 3:
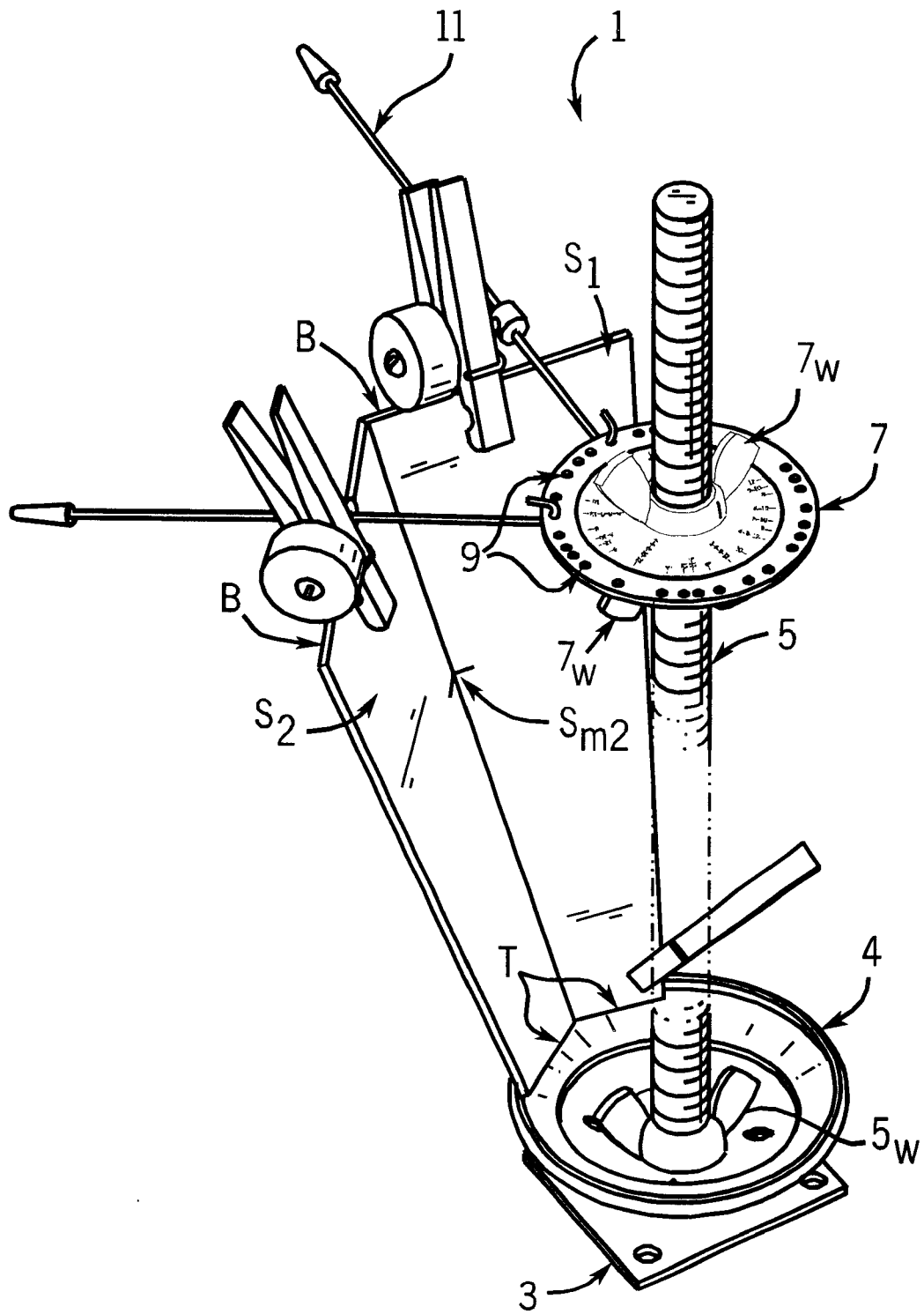
FIG. 3 shows an elevational side view of the partially assembled jig shown in FIG. 2 with two (2) glass sections retained thereby.

According to the present invention there is provided a jig (referred generally as 1) adapted for use in positioning multiple stained glass sections (generally designated as S and illustrated individually as $S_1$, $S_2$, $S_3$, $S_4$, $S_5$, $S_6$, etc.) at a predetermined spacial positioning so as to permit adjacently positioned glass sections S to be tacked and soldered together, said jig 1 comprising a base member 3 supportive of a retaining member 4 for retaining a top portion T of a glass section S at a predetermined chordal relationship for tacking onto an adjacently positioned glass section S, a vertical support 5 equipped with an adjustable disc 7 adjustable to varying heights along the vertical support 5, graduated anchoring sites 9 peripherally positioned about disc 7, a plurality of guy wires 11 each of which is equipped at one wire end portion with an anchoring connector 11a for connecting to the anchoring sites 9 and an adjustable clasping member 13 slidably engaging to guy wire 11 for clasping onto a bottom portion (B) of the glass section S, and a securing member 15 for securing the clasping member 13 at a desired radial distance from anchoring connector 11a.

As may be observed from FIGS. 1–4, the lamp jig 1 is equipped with an upper suspension system (generally referred to as 2) for retaining a bottom portion (B) of glass section S and a top retaining member 4 for retaining top portions T of stained glass sections S at a predetermined angular and radial configuration. An annular ring 4 of a circumference sufficient to retain adjacently positioned top portions T of the glass sections S in an equidistant cordial and circular relationship is typically used as the retaining member 4. As the outer parameter of the top portions T of lamp sections S increase in width, the annular ring size 4 may be correspondingly increased to accommodate the larger glass sections S or conversely correspondingly decreased so as to accommodate the glass sections S of a lesser top portion length.

A top cap as customarily provided in unassembled glass sectioned lamp shade kits provides a suitable retaining member 4 for use in the present invention. When top caps are used as the retaining member 4, the apertured opening for the lamp socket will not always seat at dead center onto post 5. In order to center and seat the retaining member 4 onto post 5, o-ring $3_O$ may be positioned upon post 5 flushly against base member 3, then the top cap retaining member 4 is spindled onto post 5 by sliding onto o-ring $3_O$ followed by seating the o-ring $3_O$ (not shown) against top cap 4 with wing nut $5_w$ so as to center it upon post 5. This permits retaining member 4 to be accurately centered onto post 5 as well as the assembled glass section S.

The upper suspension assembly 2 includes a vertical support 5 or post, an adjustable disc 7 which may be variably adjusted vertically along post 5, graduated or calibrated anchoring sites 9 radially positioned about disc 7, suspended guides 11 such as guy wires for anchoring onto the anchoring sites 9 at calibrated intervals and adjustable clasping members 13 supported by suspended guides 11 for clasping and maintaining bottom portions B of stained glass sections S at a predetermined angular pitch. Post 5 when positioned in the center of the annular ring 4 and secured to base 3 serves as a vertical support for adjustable disc 7. Post 5 is secured to base 3 by threading onto base support nut $3_n$ and then locking post 5 thereto with post wing nut $5_w$. This securely maintains post 5 in the desired supportive vertical positioning for assembly of glass sections S thereto.

In the device, disc 7 may accordingly be adjusted at varying heights along the vertical support or post 5 so as to accommodate glass sections S of various different sizes and pitches. Jig 1 is depicted as equipped with two (2) wing nuts $7_w$ which when threaded onto vertical support bolt 5 provide an adjusting means for adjusting the apertured disc 7 to any desired height for attaching the guy wires 11 in support of the bottom portions B of a stained glass sections S with clasping member 15. As may be observed from the drawings, adjustment of disc 7 to the desired position may be achieved by threading the bottom ring nut $7_w$ onto the threaded bolt 5 to desired supportive height, sliding disc 7 onto bottom wing nut $7_w$ and then seating apertured disc 7 against bottom wing nut $7_w$ by snuggly drawing the top wing nut $7_w$ against disc 7 to firmly seat disc 7 at the desired adjusted position. The vertical post S may alternatively include a threaded disc 7 for seating disc 7 onto bottom wing nut $7_w$ at any desired vertical height along support post S. If desired, disc 7 itself may be fitted with a clasp, set screw, or other suitable securing means etc. (not shown) so as to permit adjustment of disc 7 to the desired position along post 5.

Figure 4:
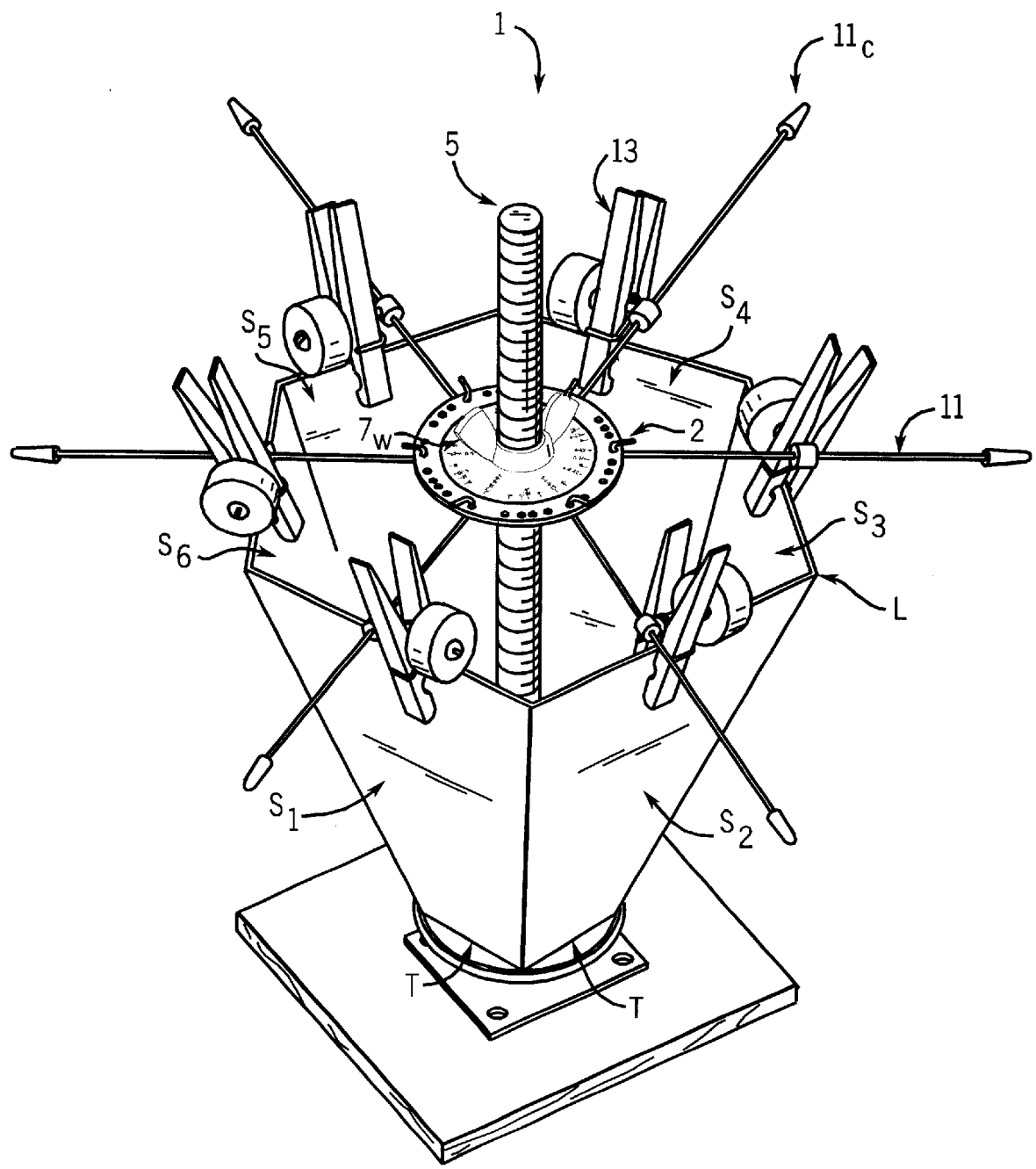
FIG. 4 is an elevational side view of the fully assembled jig with the parts shown in FIG. 1 positioned to retain six (6) glass sections for soldering.
Figure 5:
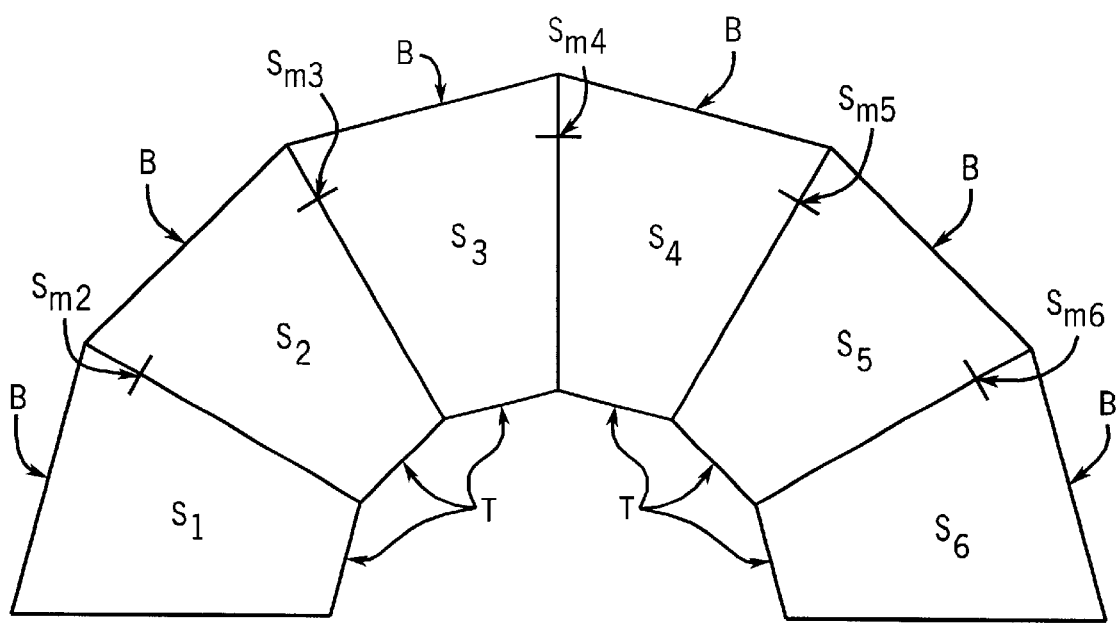
FIG. 5 depicts six (6) glass sections placed in a flat side-by-side relationship and marked so as to assure proper alignment with one another when assembled in the jig as illustrated by FIG. 4.

Disc 7 includes a plurality of anchoring sites 9 in the form of calibrated anchoring apertures positioned at gradient angular vectors about the outer periphery of disc 7. The anchoring sites 9 (as operationally used in the assembly for any given lamp shade) represent the bisecting planar axis for each glass section S which is to be assembled with jig 1. The anchoring sites 9 are positioned in incremental angular gradients so as to provide angular degrees comparable to the number of glass sections S. If the assembled lamp shade L consists of six (6) identically sized stained glass sections S as illustrated by FIGS. 4 and 5, then the usable anchoring sites 9 for anchoring the six (6) anchor guy wires 11 would be positioned at 60 degree intervals. The selected sites 9 will longitudinal bisect each of the assembled glass sections S.

The supporting guides 11 may be in the form of guy wires 11 fitted with anchoring connectors 11a at one wire end and an adjustable clasping member 13 for clasping onto the glass sections S at an opposite guy wire end. The adjustable clasping member 13 may be provided as a springed clasping member 13 (such as a clothes pin) for clasping onto the glass sections S.

The depicted securing member (generally referenced as 15) for clasping member 13 includes a ferrule 15f affixed to the clasping member 13 to permit for sliding the clasping member 13 along guy wire 11 and a set screw 15s for seating guy wire 11 onto ferrule 15f when clasping member 15 is placed at a desired position along guy wire 11. Guy wires 11 are each equipped with a vinyl cap $11_c$, sized to snuggly fit and cap the distal end of each wire 11. Caps $11_c$ serve to protect the user against injury as well as a stop for retaining clasping member 15 onto guy wire 11.

FIG. 5 depicts as suitable template marking procedure which may be undertaken before assembling the individual glass sections S onto jig 1. As illustrated in FIG. 5, the glass sections $S_1$, $S_2$, $S_3$, $S_5$, and $S_6$ are placed in orderly sequence upon a flat surface so that the cornering edges (i.e. the top cornering and bottom cornering edges) of each adjacent glass section will be aligned onto its adjacent section S. The aligned adjacently positioned glass sections ($S_1$ and $S_2$, $S_2$ and $S_3$, $S_3$ and $S_4$, $S_4$ and $S_5$, $S_5$ and $S_6$) are then marked with a template marking ($S_{m2}$, $S_{m3}$, $S_{m4}$, $S_{m5}$, and $S_{m6}$) which serve as template markings for assembling and aligning the adjacently positioned glass sections S at the desired pitch in jig 1.

When it is desired to construct a six (6) sectioned ($S_1$, $S_2$, $S_3$, $S_4$, $S_5$, and $S_6$) stained glass lamp shade L, as illustrated by FIG. 4, the top portion T of a first stained glass section $S_1$ is placed in the annular ring 4 and the guy wire 11 is anchored onto appropriately adjusted disc 7 (previously adjusted to the desired at the anchoring sites 9 for a six (6) sectional lamp shade L. The bottom portion B of each glass section S is then clasped by the clasping member 15 and adjusted to the desired angular pitch by sliding the ferrule 15f guided clasping member 15 along the guy wire 11. When the desired angular pitch is achieved, set screw 15s is tightened to anchor the clasping member 13 to guy wire 11. The next adjacently positioned stained glass section $S_2$ may then be placed at an adjacent 60 angular degree anchoring site 9 from the first anchoring site 9 of the first positioned class section $S_1$.

Figure 6:
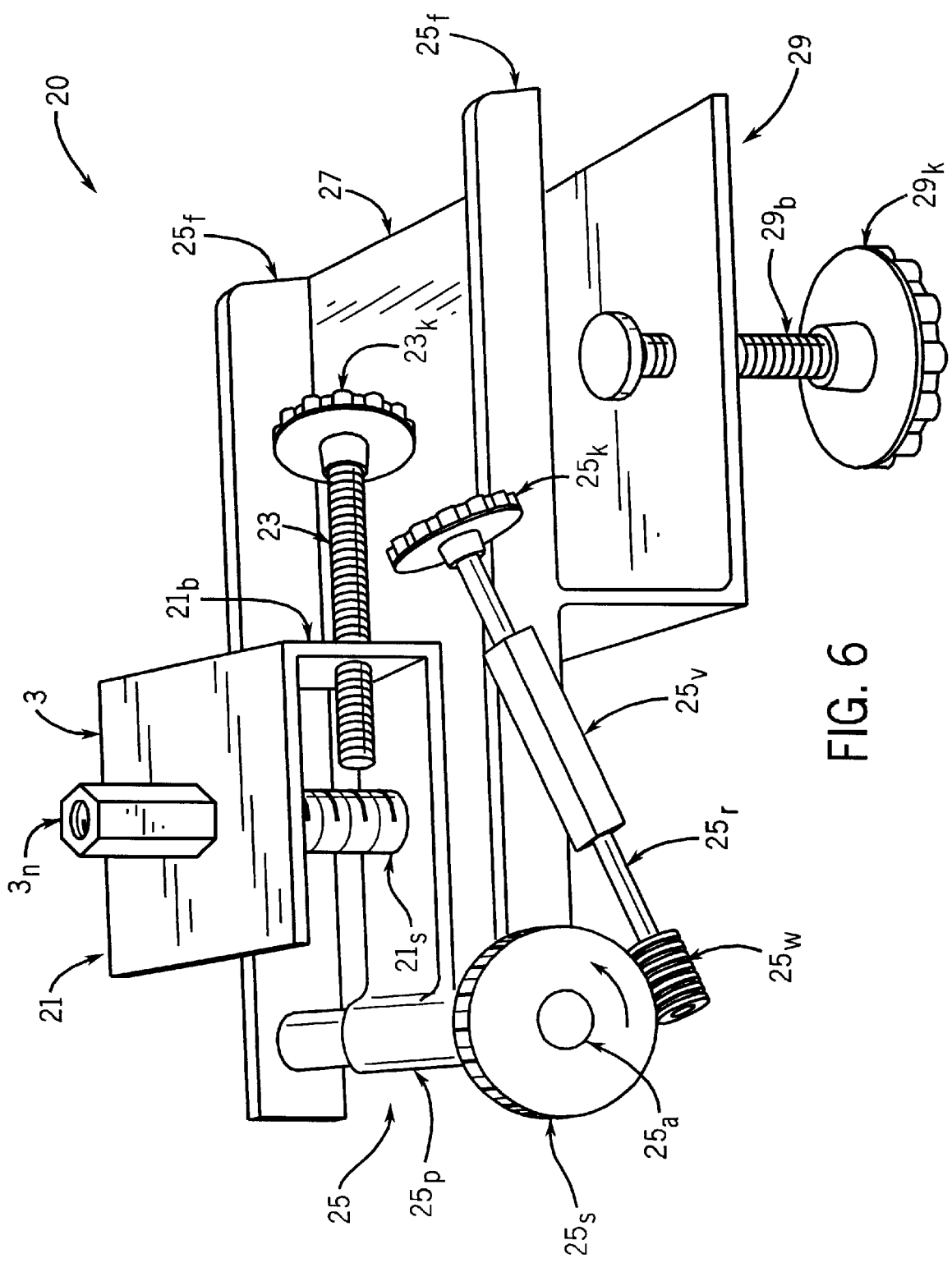
FIG. 6 illustrates a top elevational view of an adjustable base plate for the jig which allows a glass sections retained by the jig to be rotated about a vertical axis and pitched about a horizontal axis.

With reference to FIG. 5, glass sections $S_1$ and $S_2$ are adjacently positioned in jig 1 so that glass section template markings $S_{m2}$ for both sections $S_1$ and $S_2$ align with one another when assembled in jig 1. The template glass markings $S_{m2}$–$S_{m6}$, when aligned in proper sequence, assure that a uniform angular pitch is achieved. The clasping member 15 is clasped onto the bottom portion B of the second glass section $S_2$ and the clasping member 15 is adjusted and set at the same angular pitch as the first glass section $S_1$ Set screw 15s is then seated onto wire 11 and ferrule 15f so as to maintain the second clasping member 15 and second stained glass section $S_2$ in the precise configuration as desired for solder tacking. This reproducible procedure enables the jig user to maintain both the first and second glass sections $S_1$ and $S_2$ at precise angular pitches and radial dispositions. The assembler merely tacks (without manually holding) the two (2) sections $S_1$ or $S_2$ together. This procedure is sequentially repeated with each successive glass section ($S_1$, $S_2$, $S_3$, $S_4$, $S_5$, and $S_6$) with care be taken to insure that each successive section S alignment markings $S_{m3}$–$S_6$ as illustrated by FIGS. 5 and 6 match in alignment when secured to clasping member 13 for tacking. This process is sequentially repeated until all of the remaining glass sections S are tacked together. The resultant lamp shade L when soldered together exhibits extremely uniform configuration with each glass section S being maintained at a precise angular pitch and radial disposition to one another. This allows the assembler of soldered stained glass lamp shades to reproduce, with great precision, a host of identically configured stained glass lamp shades.

The jig 1 depicted by FIGS. 1–4 provides a device which allows glass sectioned lamp shades L to be assembled together in exacting and repetitive manner. Since the soldering operation is most appropriately conducted when the seam to be soldered rests in a substantially horizontal position, the jig 1 when used by itself will usually necessitate positioning of the jig 1 for tacking and then a repositioning for soldering. FIG. 6 discloses a suitable rotational and pitch adjusting accessory (generally designated as 20) which permits the assembler to rotate the sections S for tacking and a repositioning of the seams in a horizontal position for soldering.

The accessory 20 includes a base mount or base plate 3 equipped with threading nut 3 for threading onto threaded vertical support bolt 5 for the mounting of jig 1 thereto which in turn permits rotational and pitched adjustment of jig 1 during the assembly of lamp shades thereupon. The rotational and pitch adjusting device 20 includes a threaded hexagonal nut $3_n$ spindled onto base plate 3 which permits 360 degree rotational movement thereupon when vertical support bolt 5 (as shown in FIGS. 1–4) is threaded directly onto nut $3_n$. Spindled mounting unit 21 allows the attached jig 1 with positioned glass sections S to freely rotate about the longitudinal axis of spindled nut $3_n$ for the tacking of sections S together. A threaded rotational stop 23 positionally threaded onto base mount flange $21_b$ so as to seat against spindle 21s and anchor spindle $2_s$, positions the attached jig 1 at the desired rotational position. A rotational knob $23_k$ facilitates the tightening and loosening of rotational stop 23.

The rotational and pitch adjusting device 20 also includes a pitch adjusting member (generally referred to as 25) which allows the jig 1 to be adjusted to any desired pitch. This facilitates the ease upon which the assembled sections S upon the jig 1 may be tacked and then horizontally positioned and soldered together. The depicted pitch adjusting member 20 includes a pitch mounting plate $25_p$ securely affixed at one end onto flange 21 and anchored onto pitch axle $25_a$ at an opposite end. Axle $25_a$ is supported between laterally disposed channel flanges $25_f$ of channel frame support 27. Axle $25_a$ includes a drive sprocket $25_s$ driven by worm gear $25_w$ positioned at one end of a pivot adjusting rod $25_r$. Pivot adjusting rod $25_r$ is sleeved within support sleeve $25_v$ which in turn is mounted channel flange $25_f$ of support frame 27. A pitch adjusting knob $25_k$ allows the user to conveniently adjust the pitch of adjusting member 25 to the desired pitch. A clamping bracket 29 equipped with a knobbed clamping bolt $29_b$ and knob $29_k$ threaded onto bracket 29 provides a convenient mount for clamping the rotational and pitching device 20 with the attached jig 1 to any suitable work table. In the assemble of sections S, the annular retaining member 4 may be centered upon post 5 by using o-ring $3_0$ to seat it at the desired center position.

The user of jig 1 mounted to the rotational and pitch adjusting device 20, places the jig 1 in appropriate vertical positioning for assembling and tacking the sections S together while rotating until tacking of the sectioned stained glass lamp L is completed. The pitch of the tacked shade L upon jig 1 is then adjusted with knob $25_k$ to place each tacked seam in a horizontal position. When soldering of one seam is complete, rotational stop 23 is loosened, the next tacked seam is horizontally positioned, the rotational stop 23 reset and the soldering of the seam is completed. This sequence is repeated until all of the tacked seams have been accordingly placed in a horizontal soldering position and soldered.

What is claimed is:

1. A jig useful in positioning multiple stained glass sections at a predetermined spacial positioning so as to permit adjacently positioned glass sections to be soldered together, said jig comprising a base member for retaining a top portion of glass section at a predetermined chordal relationship for soldering together adjacently positioned glass sections, a vertical support equipped with an adjustable disc adjustable to varying heights along the vertical support, graduated anchoring sites peripherally positioned about the disc, a plurality of guy wires each of which is equipped at one wire end portion with an anchoring connector for connecting to the anchoring sites and an adjustable clasping member at an opposite guy end portion for clasping onto a bottom portion of the glass section, and a securing member for securing the clasping member at a desired radial distance from the anchoring connector.

2. A method for soldering together stained glass sections together with a jig having a base member for retaining top portions of the glass sections in a desired adjacently positioned pattern, a vertical post disposed within the base member, an adjustable disc adjustable to varying heights along the post, graduated anchoring sites positioned about a peripheral margin of the disc, guy supports for separately supporting bottom portions of the glass sections in a predetermined pitched alignment with adjacently positioned glass sections, with each of said guy supports being equipped at one end portion with an anchoring connector for anchoring onto one of the anchoring sites, a clasping member for clasping onto each of the bottom portions of the glass sections and an adjustable radial stop for securing each clasping member at the predetermined pitched alignment to each adjacently positioned glass section said method comprising:

a) placing a first top portion of a first glass section of said glass section in the desired adjacently positioned pattern within the base member;

b) clasping and adjusting a first bottom portion of the first glass section with a first clasping member to the desired pitched alignment by radially positioning the clasping member at a desired radial distance from the post;

c) placing a second top portion of a second glass section within the base member in a juxtapositional relationship to the first top portion of the first glass section;

d) clasping and adjusting a second bottom portion of the second glass section at the desired radial distance from the post so as to provide an unsoldered margin between the first glass section and the second glass section and;

e) soldering together at least a portion of the unsoldered margin between the first glass section and the second glass section.

* * * * *